(12) United States Patent
Madisch et al.

(10) Patent No.: US 10,389,767 B2
(45) Date of Patent: Aug. 20, 2019

(54) PUBLICATION REVIEW USER INTERFACE AND SYSTEM

(71) Applicant: ResearchGate GmbH, Berlin (DE)

(72) Inventors: Ijad Madisch, Berlin (DE); Horst Fickenscher, Berlin (DE); Sören Hofmayer, Berlin (DE); Axel Tölke, Berlin (DE); Eduardo Ojeda, Berlin (DE); Volker Dusch, Berlin (DE); Andrew Clark, Berlin (DE)

(73) Assignee: ResearchGate GmbH, Berlin (DE)

( * ) Notice: Subject to any disclaimer, the term of this patent is extended or adjusted under 35 U.S.C. 154(b) by 0 days.

(21) Appl. No.: 14/657,139

(22) Filed: Mar. 13, 2015

(65) Prior Publication Data
US 2015/0264093 A1    Sep. 17, 2015

Related U.S. Application Data

(60) Provisional application No. 61/953,543, filed on Mar. 14, 2014, provisional application No. 61/967,333, filed on Mar. 14, 2014.

(51) Int. Cl.
*H04L 29/06* (2006.01)
*H04L 29/08* (2006.01)
*G06F 17/30* (2006.01)
*G06Q 10/10* (2012.01)

(52) U.S. Cl.
CPC ......... *H04L 65/403* (2013.01); *G06Q 10/101* (2013.01); *H04L 67/306* (2013.01)

(58) Field of Classification Search
CPC ............. G06F 17/3089; G06F 17/3053; G06F 17/241; G06F 17/30; G06F 17/60; G06F 17/243; G06F 3/048

USPC .............................. 715/751, 230, 733, 501.1
See application file for complete search history.

(56) References Cited

U.S. PATENT DOCUMENTS

| | | | |
|---|---|---|---|
| 7,895,275 B1 | 2/2011 | Evans et al. | |
| 2003/0149597 A1* | 8/2003 | Zaleski | G06Q 50/24 705/2 |
| 2004/0191743 A1* | 9/2004 | Chiu | G09B 19/0053 434/322 |
| 2005/0120294 A1* | 6/2005 | Stefanison | G06Q 10/10 715/223 |
| 2006/0123348 A1* | 6/2006 | Ross | G06F 17/243 715/751 |

(Continued)

FOREIGN PATENT DOCUMENTS

WO    WO-2005013162 A1    2/2005
WO    WO-2015170182 A2    11/2015

OTHER PUBLICATIONS

"International Application Serial No. PCT/US2015/020398, International Search Report dated Jun. 25, 2015", 2 pgs.

(Continued)

*Primary Examiner* — Sang H Kim
(74) *Attorney, Agent, or Firm* — Schwegman Lundberg & Woessner, P.A.

(57) ABSTRACT

Disclosed are systems, apparatus, and methods for managing user reviews of publications within an online user network. Various user interfaces may provide access to view a publication and request a review thereof, solicit and receive reviewing information from the requesting or another user (or multiple users), and provide access to a review generated from the received reviewing information.

23 Claims, 16 Drawing Sheets

(56) References Cited

U.S. PATENT DOCUMENTS

| | | | |
|---|---|---|---|
| 2006/0143066 A1* | 6/2006 | Calabria | G06F 17/30867 705/7.29 |
| 2008/0133298 A1 | 6/2008 | Mcqueen et al. | |
| 2009/0119258 A1* | 5/2009 | Petty | G06Q 10/10 |
| 2009/0157490 A1* | 6/2009 | Lawyer | 705/11 |
| 2009/0204469 A1* | 8/2009 | Markram | G06Q 10/10 705/326 |
| 2010/0325584 A1* | 12/2010 | McKenzie | G06Q 50/18 715/835 |
| 2011/0225024 A1* | 9/2011 | Seyer et al. | 705/12 |
| 2011/0307397 A1* | 12/2011 | Benmbarek | 705/319 |
| 2012/0150851 A1* | 6/2012 | Agrawal | G06F 17/30707 707/728 |
| 2012/0233558 A1* | 9/2012 | Naim et al. | 715/760 |
| 2013/0031455 A1 | 1/2013 | Griffiths et al. | |
| 2013/0091419 A1* | 4/2013 | Caliman | G06F 17/241 715/236 |
| 2013/0132221 A1* | 5/2013 | Bradford et al. | 705/26.1 |
| 2013/0144862 A1* | 6/2013 | Ruhl | G06F 17/30873 707/710 |
| 2014/0006341 A1* | 1/2014 | Lopulalan | G06F 17/30 707/608 |
| 2014/0279233 A1* | 9/2014 | Lau | G06Q 30/0207 705/26.41 |
| 2014/0289161 A1* | 9/2014 | Johnson | G06Q 30/0282 705/347 |

OTHER PUBLICATIONS

"International Application Serial No. PCT/US2015/020398, Written Opinion dated Jun. 25, 2015", 5 pgs.

"International Application Serial No. PCT/IB2015/001291, International Search Report dated Dec. 2, 2015", 5 pgs.

"International Application Serial No. PCT/IB2015/001291, Written Opinion dated Dec. 2, 2015", 6 pgs.

"Application Serial No. 15778384.6, Communication pursuant to Article 94(3) EPC dated May 15, 2017", w/ English Translation, 7 pgs.

"Application Serial No. 15778384.6, Response filed Sep. 11, 2017 to Communication pursuant to Article 94(3) EPC dated May 15, 2017", 18 pgs.

"European Application Serial No. 15778384.6, Summons to Attend Oral Proceedings dated Feb. 22, 2018", 9 pgs.

\* cited by examiner

Edgar Smith
Institute of Technology
[Follow]
— 200

Article
Advancements in lorem ipsum in machine-readable text
[Alfred Riddle] [Ben Adams] [Edgar Smith]
[David Brown] [Joe Carson] [Beverly Jones] [more]
Culture (Impact Factor: 38.6). 03/2014; 514(7485):331-7. DOI: 10.1028/culture 13930
Source: PubMed ABSTRACT Lorem ipsum dolor sit amet, consectetuer adipiscing elit. Aenean commodo ligula eget dolor. Aenean massa. Cum sociis natoque penatibus et magnis dis parturient montes, nascetur ridiculus mus. Donec quam felis, ultricies nec.

| Tag your publication with topics |

| Discuss | Share | Bookmark | Edit | 33 Bookmarks - 6,871 Views |

CITATIONS (53)  CITED IN (45)

Did you cite this publication?  [Add Citation]

Article: Research: Initiatives to Improve application of lorem ipsum.
Randolph P. Jones
Technology Perspectives 07/2014; 133(6):A188-A191.
-7.26 Impact Factor
Source  [Request full-text] [Bookmark]

Article: Putting the lorem back: per aspera ad astra.
Detlef Schlammberg
Ipsum internatinal 05/2014; 85(5):991-998.
-8.52 Impact factor
[Request full-text] [Bookmark]

Article: Lorem therapy: a new approach to the treartment of ipsum.
Kim Bramberger, Joe Dandioff, Wlater Herman, Ken Cruise, Peter Hancock, Tom Pfeffer
[Show abstract]
Source  Journal of Lorem Transmission 03/2014;
-3.05 Impact factor
[Download] [Bookmark]

Show more

[Send the authors a message]
[Request supplementary resources]
[Is this your publication?]
FULL-TEXT (2 Sources) — 202
[View]
1,096 DOWNLOADS View other sources Open Review
Be the first to review this publication, or request a review from other specialist on ResearchGate. — 206
[Review this publication]
[Review request]
Total review requests: 1 — 208

| Edgar Smith | Follow |
| Institute of Technology | |

Article review

Advancements in lorem ipsum in machine-readable text

*400*  *402*

| Is this research reproducible? | Yes | No | Not applicable |

> CONCLUSIONS
Are the interpretations and conclusions justified by the results?
Yes | No | Partly > FINDINGS
Do the authors provide an interesting discussion, and are the findings novel?
Yes | No | Partly > REFERENCES
Do the authors refer to the latest research in the field, and is it correctly referenced?
Yes | No | Partly > ANALYSES
Have the analyses been performed appropriately and rigorously?
Yes | No | Partly METHODOLOGY
Are the tools and methods appropriately applied, and are the data correct?
Yes | No | Partly

[Delete draft]   [Preview review]

Welcome to Open Review

This feature lets you evaluate research you've read and worked with. It is important that you make any necessary edits before publishing.

Feedback on this feature? Tell us what you think

◁ Research is considered reproducible if it can be repeated by someone else working independently, or by using different equipment or techniques to produce the same outcome.

All reviews of article: — 500

Advancements in lorem ipsum in machine-readable text

Open Review

Join ResearchGate to comment on this review or create of your own.

[Alfred Riddle] [Ben Adams] [Edgar Smith]
[David Brown] [Joe Carson] [Beverly Jones] [more]

Join for free — 504

REVIEWERS (2)

Summary of all reviews
Cumulative stats — View summary

John Jones
National Institutes of health — View
Non-reproducible

Lou Lin
The Chinese University — View
Non-reproducible

| OVERVIEW | | METHODOLOGY | | ANALYSES | |
|---|---|---|---|---|---|
| Is this research reproducible? | | Are the tools and methods appropriately applied, and are the data correct? | | Have the analyses, including statistical analyses, been performed appropriately and rigorously? | |
| Reproducible | 0 | Yes | 0 | Yes | 2 |
| Non-reproducible | 2 | No | 2 | No | 0 |
| Not applicable | 0 | Partly | 0 | Partly | 0 |
| REFERENCES | | FINDINGS | | CONCLUSIONS | |
| Do the authors refer to the latest research in the field, and is it correctly referenced? | | Do the authors provide an interesting discussion, and are the findings novel? | | Are the interpretations and conclusions justified by the results? | |
| Yes | 0 | Yes | 0 | Yes | 0 |
| No | 0 | No | 0 | No | 0 |
| Partly | 0 | Partly | 0 | Partly | 0 |

— 502
— 506

Top reviews for this publication

Lou Lin
The Chinese University
Non-reproducible — Read review

Are the tools and methods appropriately applied, and are the data correct?

Lorem ipsum dolor sit amet, consectetuer adipiscing elit. Aenean commodo ligula eget dolor. Aenean massa. Cum sociis natoque penatibus et magnis dis parturient montes, nascetur ridiculus mus. Donec quam felis, ultricies nec, pellentesque eu, pretium quis, sem. Nulla consequat massa quis enim. Donec pede justo, fringilla vel, aliquet nec, vulputate eget, arcu. In enim justo, rhoncus ut, imperdiet a, venenatis vitae.

John Jones
National Institutes of health
Non-reproducible — Read review

Sign Up >

Are the tools and methods appropriately applied, and are the data correct?

Lorem ipsum dolor sit amet, consectetuer adipiscing elit. Aenean commodo ligula eget dolor. Aenean massa. Cum sociis natoque penatibus et magnis dis parturient montes, nascetur ridiculus mus. Donec quam felis, ultricies nec, pellentesque eu, pretium quis, sem. Nulla consequat massa quis enim. Donec pede justo, fringilla vel, aliquet nec, vulputate eget, arcu. In enim justo, rhoncus ut, imperdiet a, venenatis vitae.

| CONCLUSIONS | |
|---|---|
| Are the interpretations and conclusions justified by the results? | Partly |
| Lorem ipsum dolor sit amet, consectetuer adipiscing elit. Aenean commodo eget dolor. Aenean massa. Cum sociis natoque penatibus et magnis dis parturient montes, nascetur ridiculus mus. Donec quam felis, ultricies nec. | |

SUPPORTING RESOURCES

Figure Review     Figure Review

Source            Source

← 608

COMMENTS (61)
　　　　　　　Show previous comments

 John Jones      20.73 - 62.74

← 610

Mention of this review is featured on ABC News
Feb 20, 2015
Lorem ipsum dolor sit amet, consectetuer adipiscing elit. Aenean commodo ligula eget dolor

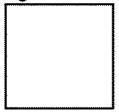 Lou Lin         40.79 - 300.56

Feb 21, 2015
Lorem ipsum dolor sit amet, consectetuer adipiscing elit. Aenean commodo ligula eget dolor

*FIG. 6B*

PUBLICATION REVIEW USER INTERFACE AND SYSTEM

CROSS REFERENCE TO RELATED APPLICATIONS

The present application claims the benefit of priority to U.S. Provisional Application Ser. No. 61/953,543, filed Mar. 14, 2014, and also U.S. Provisional Application Ser. No. 61/967,333, filed Mar. 14, 2014, the entirety of each of which is hereby incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2014, RESEARCHGATE CORPORATION, All Rights Reserved.

TECHNICAL FIELD

This patent document pertains generally to publication technology, and more particularly, but not by way of limitation, to a user interface and system to harvest and publish review information relating to a publication.

BACKGROUND

The automated harvesting and publication of review information (e.g., related to an academic or technical publication) in an open and transparent manner may present a number of technical challenges, specifically with respect to the person-machine interface to solicit, receive, and then publish such review information. Free-form review submission interfaces may not, for example, harvest review information that is particularly uniform, or that encourages reviewers (e.g., scientist or researchers) to focus review comments on any one or more aspects of a publication that are particularly pertinent. Furthermore, the automatic harvesting and publishing of reviews may, due to the lack of (or reduction in) human oversight, fail to establish a level of consumer trust in the review quality that is comparable with that generally placed in traditional human-managed peer reviews (as implemented, e.g., by many scientific journals). In addition, since the automated system ultimately depends on human input of review information, its success and utility to the community of review consumers at large is a function of the ability of the system to encourage or incentivize reviewer participation.

BRIEF DESCRIPTION OF DRAWINGS

Some embodiments are illustrated by way of example and not limitation in the figures of the accompanying drawings in which:

FIG. 2A is a schematic user interface diagram illustrating an example publication user interface providing information about and access to a publication in accordance with various embodiments.

FIG. 2B is a schematic user interface diagram illustrating an example publication user interface providing, along with information about the publication, access to a review of the publication, in accordance with various embodiments.

FIGS. 4A-4C are schematic user interface diagrams illustrating example user interface screens for soliciting and receiving publication review information from a user in accordance with various embodiments.

FIG. 5 is a schematic user interface diagram illustrating an example review user interface providing a review overview in accordance with various embodiments.

FIGS. 6A and 6B are schematic user interface diagrams illustrating an example review user interface providing review information to a consumer thereof in accordance with various embodiments.

DETAILED DESCRIPTION

Described herein are systems and methods for integrating reviews of publications into an online social network, allowing network users to post and/or facilitate access to their own original publications, review other users' publications, read and provide feedback on reviews, and/or otherwise engage in an open discourse about publications. Beneficially, in various embodiments, not only the impact and quality of a user's publications (as determined, e.g., based on the number of views and citations as well as the reviews), but also the quality of reviews she contributes (as determined, e.g., based on feedback on the reviews) and/or her overall level of engagement (as determined, e.g., based on the frequency of postings, whether publications, reviews, comments, or other) can affect her standing and reputation within the social network (implicitly via other users' reaction to her postings, and/or via explicit scores, rankings, etc. computed by the automated system), providing a strong incentive for publishing high-quality work and reviews and/or otherwise contributing to the discourse. In some embodiments, publication reviewers receive guidance from the automated system via a set or sequence of structured review questions, enhancing the uniformity and relevancy of the reviews.

In various embodiments, the social network is closed or partially closed inasmuch as access to certain functionality, such as the ability to contribute content, is limited to a specified user group (whereas, e.g., read access may be provided to the public at large). For example, in some embodiments, the network is limited to academic users, and the content focusses on academic publications and reviews and communications related thereto. While the example of an academic publication and review system is used throughout this disclosure for illustration purposes, many of the embodiments and features described herein may also applicable to other user groups and types of publications. To name but a few examples, systems and methods in accordance herewith may find application in the publication, review, and discussion of works of literature, film, art, or music; news and other journalistic publications; meal recipes; etc. It will be readily apparent to those of ordinary skill in the art, from the following detailed description and drawings, how the embodiments described herein can be adjusted to such other application contexts.

In the following description, for purposes of explanation, numerous specific details are set forth in order to provide a thorough understanding of some example embodiments. It will be evident, however, to one skilled in the art that the present invention may be practiced without these specific details.

Figure 1:
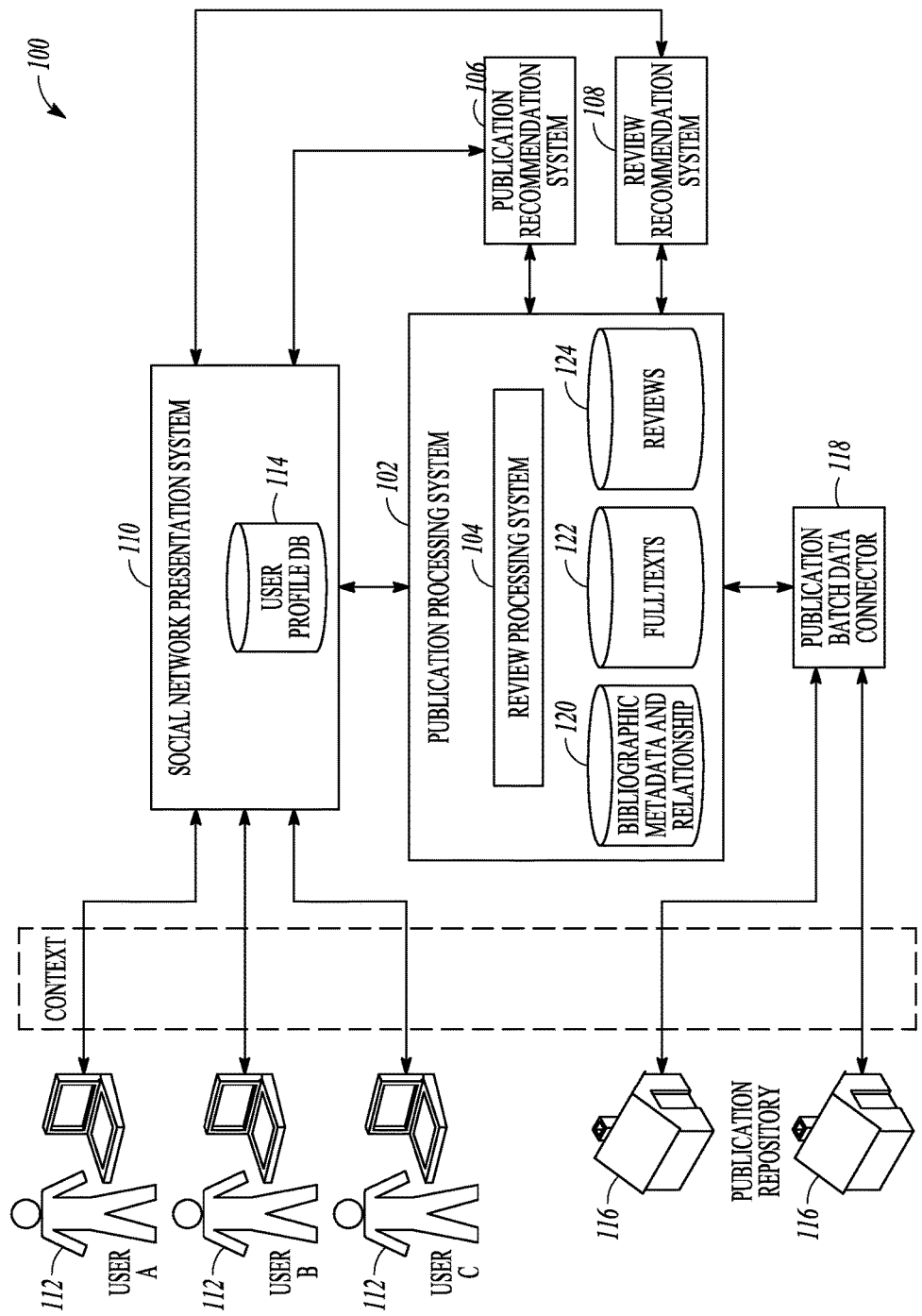
FIG. 1 is a block diagram depicting a social-network and publication system with integrated review functionality in accordance with various embodiments.

FIG. 1 is a block diagram depicting a social network and publication system 100, according to an example embodiment, that integrates functionality for harvesting and publishing review information pertaining to publications (e.g., textual, graphic, image, video etc.). The social network and publication system 100 may including various sub-systems such as a publication processing system 102, a review processing system 104 (which may, but need not, form a component within the publication processing system 102), a publication recommendation system 106, and a review recommendation system 108, all of which interact with a social network presentation system 110. Users 112 (e.g., users A, B, and C) may register with the social network presentation system 110 by providing user-profile information, such as a name, institutional affiliation, contact information (e.g., email address), etc., and establishing network-access credentials such as, e.g., a user name (which may be the user's email address) and password. The user-profile information may be stored within a user-profile database 114 of the social network presentation system 112. In some embodiments, eligibility to register as a user is based on certain conditions, such as academic credentials, and may be determined based on the user-provided profile information during sign-up. For example, the ability to register may be contingent upon providing an email address associated with an academic or research institution recognized by the system; a comprehensive list of such institutions may be established, and extended from time to time upon request and/or as necessary, by a system administrator. Alternative factors that may render a user eligible to register include, for instance, co-authorship of a publication posted by an existing registered user or other evidence of involvement in the creation of scientific knowledge, e.g., in the form of published articles or association with an academic institution or a research-and-development function of a governmental or corporate institution, as may be proven to a system administrator in an application process.

Once registered, a user 112 may have the ability to upload her publications to the system 100. Alternatively or additionally, the system 100 may conduct a batch import of publications, e.g., by downloading them from openly accessible third-party publication repositories 116 (e.g., as provided on the web sites of many universities); such batch-import functionality may be provided by a publication batch data connector 118. Subsequently, the system 100 may allow its users to link the already downloaded publications to their respective user profiles by claiming authorship (or co-authorship). For instance, as part of the sign-up process, the system may automatically present the new user 112 with a list of publications that match the user's name (and optionally his institutional affiliation), or have otherwise been identified as potentially authored or co-authored by the new user, and request confirmation from the user that he is, indeed, an author of this publication. A "publication," as used herein, may be a work already published by a third party (i.e., outside the social-network environment) (to the extent allowed by copyright law), such as an academic article included in a scientific journal, or a (perhaps preliminary) work first published within the social network and publication system 100, such as a draft of an academic article that has not yet been submitted for publication and/or is not intended for submission to any journal. (Sometimes, to comply with the copyrights of third-party publishers, users may upload final drafts of their works, but not the final typeset publication as it appeared in the third-party journal.) Alternatively to uploading a full-text version of his publication directly to the publication system, a user 112 may enter bibliographic information and/or provide a link to an external web site where the publication is available (e.g., for purchase). Some embodiments also allow the user to provide an original publication in a structured format (e.g., including separate sections of text, image files, etc.) rather than in a single, full-text file. The publication is generally stored in the system 100 in the form of one or more publication data objects, such as data structures (e.g., tables, records, or entries within a database) and/or data files. For example, in various embodiments, the publication processing system 102 stores, for each uploaded or entered publication, publication metadata, and, if available, a full-text version of the publication, or otherwise a link thereto. The publication metadata, and optionally links to full-text documents, may be stored in a publication database 120, and full-text files (e.g., in the form of pdf documents) may be stored in a separate full-text publication repository 122.

The social network and publication system 100 may provide search functionality that allows users to search for publications of interest based on, for example, the field of research, the author's name, or specific citation information. Alternatively or additionally, the publication recommendation system 106 may automatically provide a list of potential publications of interest based on the user's profile (which may include, e.g., a list of her research interests and/or a list of her own publications) and/or other user-specific information (e.g., her prior search and browsing history within the network, the research interests of people to whom she is related within the social network). Whether provided in response to a search request or as an independent system recommendation, publications may be ranked based on various criteria (in addition to their relevancy to the user's request or the match to the user's interests in general), including, e.g., the recency of the publications, the reviews they have received, the reputation of their authors, the number of times they have been cited, etc.

Figure 2B:
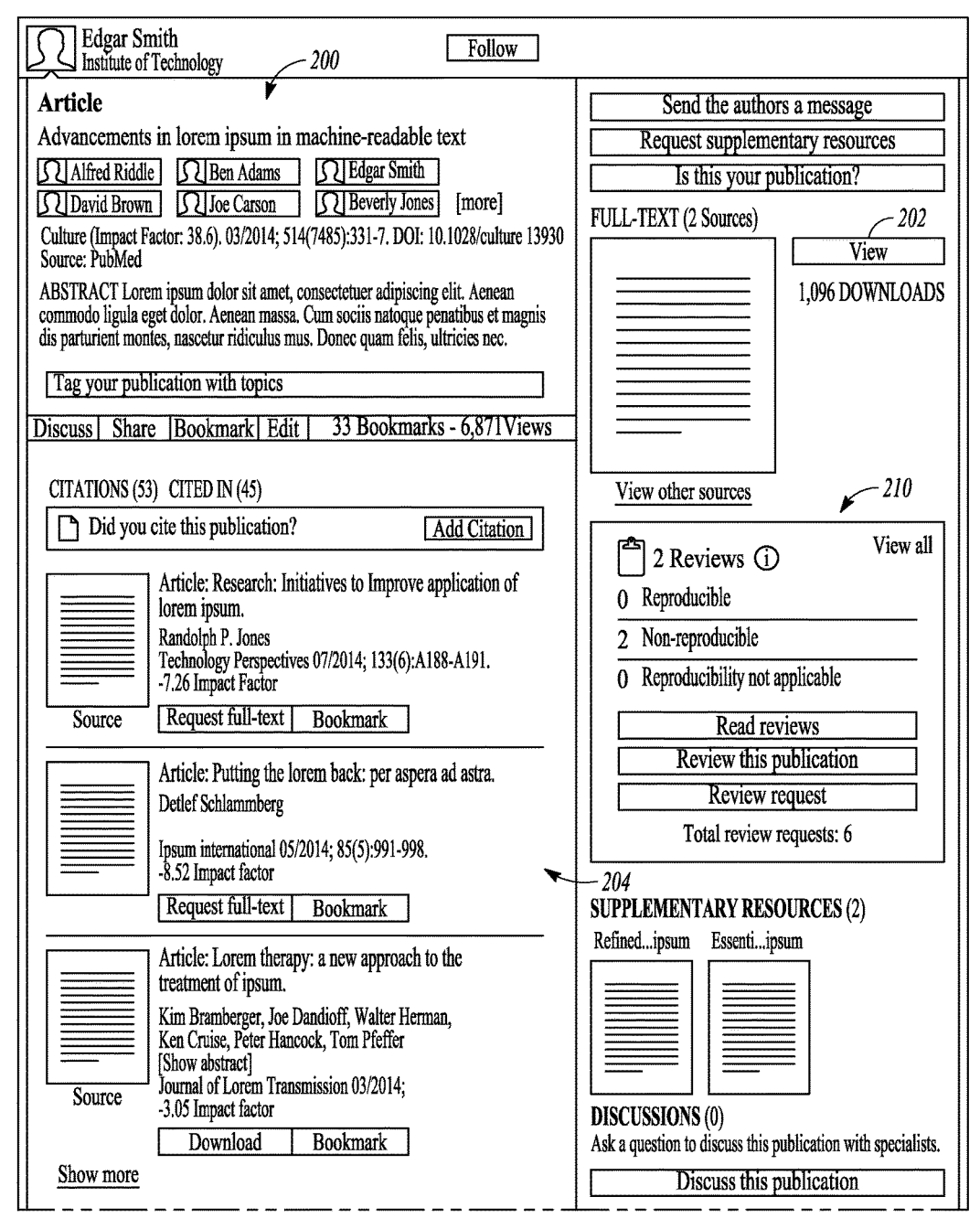

When a user selects a certain publication for viewing, she may be presented with a user interface that provides access to the publication or a portion thereof; an example publication user interface is shown in FIG. 2A. The user interface may provide access to the publication by directly displaying the publication (or portion thereof), or—as illustrated in FIG. 2A—by displaying at least the publication metadata 200 (such as bibliographic information including, e.g., the title, authors, journal, and/or an abstract) and providing a link 202 to the full-text version of the publication (e.g., a link to a system-internal website or to a third-party website from which the publication may be downloaded) or a user-interface element (e.g., button) allowing the user to request such a full-text version (e.g., by automatically sending a message to the author indicating the requesting user's interest in the publication). The user interface may also include links to the authors' user profiles (to the extent they are registered system users themselves) or automatically generated author profiles for non-registered authors, lists 204 of and links to references that cite the publication or were cited in the publication, and/or other information related to the publication. Further, the user interface may include one or more suitable user-interface elements (e.g., one or more suitably labelled buttons 206, 208 (e.g., "Review this publication" and/or "Review request")) that allow a user to indicate that she wishes to review the publication or to request a review of the publication by another user. By activating such a user-interface element 206 or 208, the user may execute a link that leads her to a review-input user interface, where she may enter or upload review information (such as, e.g., ratings for a number of review questions, free-text comments, supporting documents, relevant citations, etc.). Alternatively to navigating away from the original publication user interface to an entirely new user interface, activating the user-interface element to request a review may trigger changes to just a portion of the publication user interface (e.g., appearance of a comment field in a portion of the screen), the display of pop-up windows where the review information may be entered, and the like.

The review processing system 104 may guide the user through the review by soliciting and receiving review information, e.g., with a sequence of review-input screens presented as part of the review-input user interface. The review processing system 104 further processes the received review information for storage, in the form of one or more review data objects (including data structures and/or data files), in a review data repository 124 (which may include, e.g., one or more databases and/or file repositories, and, although depicted separately from the publication database 120 and full-text repository 122, may be integrated therewith in whole or in part). For example, the answers to a series of structured review questions may be stored in a database, and any supporting documents (e.g., images or research data sets) may be stored in a separate repository and properly linked to the database entry for the review. The review information is stored in association with the publication to which it pertains, e.g., by virtue of suitable (cross-)references between the publication data objects and review data objects as integrated in the data objects themselves or stored in a separate reference index.

Once the publication has been reviewed, the review(s) (or portions thereof) may be accessible from the user interface for the publication to which they pertain. For example, links to and/or a summary of the review(s) may be displayed along with the other publication information. In some embodiments, illustrated in the example user interface shown in FIG. 2B, the publication user interface merely indicates the availability and/or number of reviews (generally indicated at 210) optionally categorized based on their main conclusion (e.g., whether the published research is reproducible), and provides a link to a separate review user interface where more detailed review information is displayed. The review user interface (or the publication user interface if displaying review information) may also provide functionality to users reading the reviews to provide feedback, e.g., by rating the helpfulness of a review or providing free-text comments on the reviews. This feedback may be processed by the review processing system 104 (or a separate feedback processing module) and stored, as one or more feedback data objects in association with the review, in the review data repository 124 (or a separate feedback data repository). The feedback may be fed into the review recommendation system 108, which may rank the reviews and/or selects reviews for display based on their relative utility to users. Feedback on reviews may also be used within the social network and publication system to compute user scores or ratings. Further, as the reader will readily appreciate, feedback on reviews can, of course, implicitly affect the user's reputation and standing within the social network, regardless of any explicitly computed and published metrics.

The social network and publication system 100 may include functionality for finding and analysing connections and the level of relatedness between users (i.e., their "social relatedness," which may reflect, for example, direct social connections between two people, affiliation with the same institution, publications by two people with a common co-author, receipt of funding from the same source, etc.) and between users, publications, and reviews (i.e., "interest relatedness," which may reflect, for example, a cluster of topics of interest to each user, as may be computed from the user's own publications). Both the publication recommendation system 106 and the review recommendation system 108 may take social and interest relatedness into account in making publication and review recommendations, respectively. Further, both sub-systems 106, 108 may consider relationships between publication authors, reviewers, and review consumers providing feedback to determine possible positive or negative biases and adjust the impact of the review or feedback based thereon. For example, positive reviews or feedback may be discounted if originating from co-workers, as determined based on institutional affiliations, co-authorship of previous publications, etc.

In various embodiments, every item of user-generated content available on the system is accompanied by information identifying the content-generating user and, optionally, also information indicative of the user's reputation. For example, the content-generating user's name and photo, and optionally a link to her user profile, may be displayed along with the content. As indicators of the user's reputation, her institutional affiliation and/or scores relevant to reputation (such as a score computed by the social network and publication system based on data known to the system (e.g., on the user's publication record, reviews and ratings by other users, her level of activity within the system, etc.), or the well-known impact factor calculated from the number of articles a user has published in conjunction with the reputation of the journals in which they were published) may be shown. In this manner, consumers of user-generated content (including publications, publication reviews, or comments/feedback on such reviews) can quickly ascertain the reputation of the content-generating user, and take this information into account when deciding which content to read.

Figure 3A:
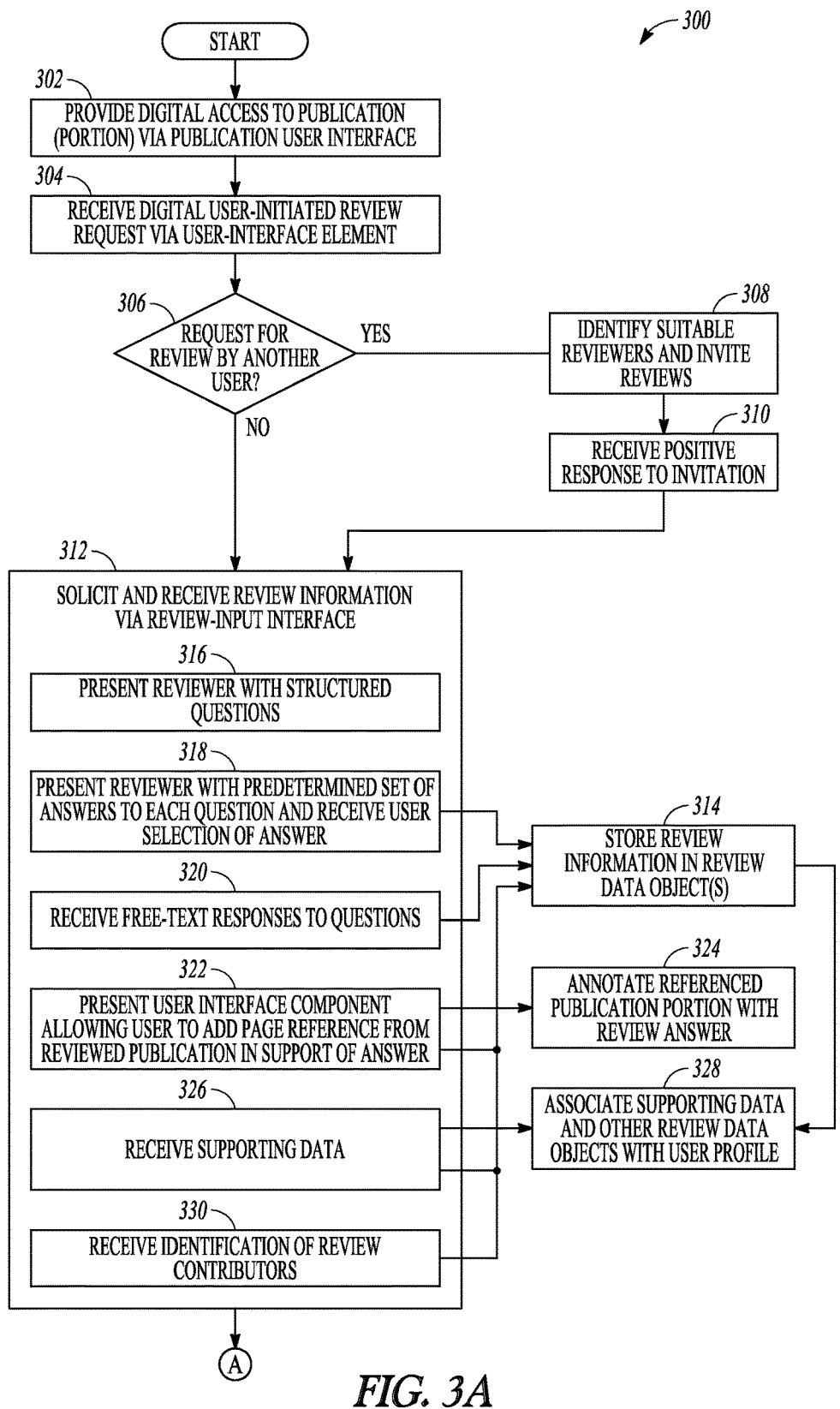
FIGS. 3A and 3B are a flow chart illustrating a method for harvesting and publishing review information in accordance with various embodiments.
Figure 3B:
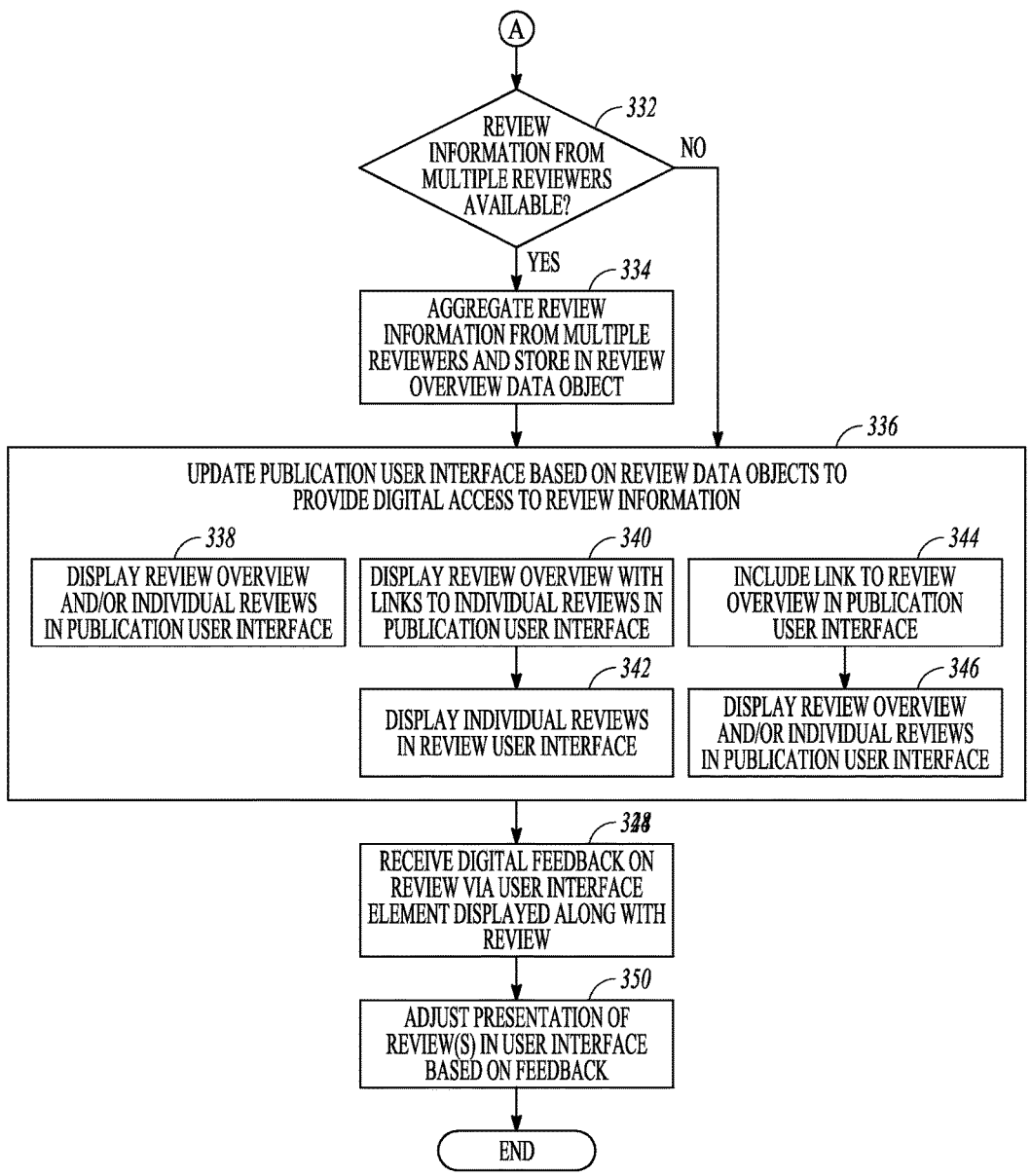

Referring to FIGS. 3A and 3B, an example process 300 for gathering and processing review information, and publishing the resulting review, within an online social network and publication system (such as system 100 of FIG. 1) will now be described. Starting point of the process is usually that a user is provided with digital access to a certain publication (or portion thereof) via a publication user interface generated based on one or more publication data objects stored for the publication (operation 302). For example, as discussed above, the publication user interface may directly display (part of) the publication, or display publication metadata and a link to the full-text publication document. The review process is triggered when the user requests a review of the publication (which may be a request for the opportunity to review the publication herself, or a request for review by another user), e.g., by activating a user-interface element included, for this purpose, in the publication user interface, and the system receives this digital user-initiated review request (operation 304).

The review request can indicate the user's desire to review the publication himself, or his interest in having one or more other users review the publication (as determined at 306). In some embodiments, two separate user-interface elements are provided on the publication user interface to implicitly distinguish between these two cases (in which case 306 does not involve a separate step). In other embodiments, user activation of a general review-request user-interface element initiates a user-system dialog to determine whether the user wishes to provide the review herself or request another user's review. In yet other embodiments, the system, by default, proceeds to present the review-requesting user with a user interface where she can input review information, but which allows her to indicate that she does not wish to conduct the request review herself In cases where the user requests review of the publication by another user, the system (e.g., via its review processing system or another suitable sub-system) may identify suitable potential reviewers (such as researchers in the field to which the publication pertains, in particular those with high academic credentials and/or numerous and/or impactful publications on related topics), and invite the identified candidates to submit a review, e.g., by sending emails that contain a link to a user interface where review information can be provided (operation 308). In some embodiments, one or more suitable reviewers are identified by the system based at least in part on a match between their interests to the topic of the publication at issue, where users' interests can be determined, in a simple implementation, from user profile information or, in more sophisticated implementations, from an interest-relatedness score (as computed, e.g., based on an analysis of each user's publication record and/or links between users, publications, reviews, etc.).

Once a reviewer request the opportunity to review a publication, or accepts an invitation to do so (operation 310), the system may solicit and receive review information from her via a review-input user interface (operation 312), and store the review information in one or more review data objects associated with the publication (operation 314). In various embodiments, the review-input user interface (which may include multiple sequentially displayed screens) is configured to guide the user through the review process. For example, as depicted, the user may be presented with a set of structured, predetermined questions (see sub-operation 316) (e.g., relating to the reproducibility of an experiment, the appropriateness of the methodology or analysis applied, the inclusion of relevant citations to related work, the novelty and/or importance of the findings, the justification of the conclusion in view of the results). Associated with each of these questions may be a predetermined set of answers (e.g., yes, no, partly, not applicable), from which the reviewing user may select one answer in response to the question (e.g., using radio buttons, a drop-down menu, or some other user-interface control element provided in conjunction with the answer choices) (see sub-operation 318). Alternatively or additionally, the user may have an opportunity to provide a free-style textual response, e.g., via a text input field (see sub-operation 320). For example, in one embodiment, the text input field may be presented in response to receiving user selection of an answer from a predetermined set of answers. The text input field may facilitate high-quality review by prompting the reviewing user to provide a more thorough response, and also to justify the selection of the answer from the predetermined set. To allow the reviewing user to conveniently format provided textual review information, the text input field may provide various text formatting capabilities (e.g., bold, italics, strikethrough, bullet points). The reviewing user's answers (whether provided by selection of one of a set of predetermined answer options and/or in the form of free text) may be stored in association with the question, e.g., in a review database.

Figure 4B:
Figure 4C:

In some embodiments, the set of questions is presented to the reviewing user in a sequential manner, prompting the user for the progressive disclosure of answers. For example, the user may first be presented with a primary question and a set of reply options, and only upon receipt of an answer to the primary question are follow-up questions displayed or made available for answer. Referring to the review-input user-interface screens shown in FIGS. 4A-4C, the primary question 400 may, for instance, ask whether research presented in the publication is reproducible (FIG. 4A). Once the user selects one of the answer options 402 (e.g., yes, no, not applicable), a set of follow-up questions 404 may be activated, presented, or made available for answer, either simultaneously or sequentially. In the illustrated example, five follow-up questions related to conclusions, findings, references, analyses, and methodology of the publication being reviewed are presented, each in conjunction with a user-selectable answer (e.g., yes, no, partly) (FIG. 4B). (In some embodiments, the follow-up questions are displayed along with the primary question at the outset, but are not available for user selection until the primary question has been answered (in other words, they are "greyed out"). This is illustrated in FIG. 4A with shading of the area showing the follow-up questions.) Upon selection of one of the answer choices for any of the questions, a text-entry field 406 may appear, allowing the user to provide a comment supporting his answer (FIG. 4C). In some embodiments, as shown, the reviewing user is asked to answer at least one of the follow-up questions. In other embodiments, she is sequentially presented with all of the questions, for instance, such that, when the reviewing user has provided an answer to the primary question (e.g., is the research reproducible), a first follow-up question (e.g., are the interpretations or conclusions justified by the results?) is visually highlighted and the predetermined set of answers is enabled for user selection. Note that, in this example, the other follow-up questions are not enabled for answer provision until a current follow-up question has received an answer. In this way, the method walks the reviewing user sequentially through the predetermined set of follow-up questions, enabling a subsequent question for answer upon receiving an answer for a current question.

Referring again to FIGS. 3A and 3B, in some embodiments, a text input field facilitating free-text responses to review questions may also enable the convenient referencing of certain pages or portions of the publication being reviewed in support or justification of the reviewer's answer. To this end, an "insert page reference" interface component may be displayed (sub-operation 322), which allows the reviewing user to search for and manually select one or more portions of content (e.g., text or otherwise) from the publication for insertion into the text input field. The "insert page reference" interface component may automatically supplement the reviewer's comments with a reference to the selected portions of content, indicating an exact location within the publication where the selected portion of content resides; in some embodiments, this reference takes the form of an executable link to the relevant portion of the full-text publication. The inclusion of such reference location data makes it convenient for a further user reading the review to validate or review justification information provided by the reviewing user. Conversely, the "insert page reference" interface component may also automatically insert a reference in the full-text publication to the review (operation 324), e.g., by supplementing the portions of content on which a certain review response is based with a link to that response. This allows a reader of the full-text publication to easily discover relevant review content based on annotations in the text being read.

In some embodiments, the full-text publication can also be annotated directly, and making such an annotation may (but need not in every embodiment) result in the automatic initiation of a review process. Annotations in a publication may indicate other scientific publications in which the annotated publication is cited or which are relevant to the subject matter of the annotated publication, include links to relevant reviews and discussions, and/or simply record the reader's comment on the publication. In this manner, a publication becomes a dynamic or "living" document containing the original full-text version as well as various discussions, citations, and reviews that arise in connection to it (and/or references thereto).

In some embodiments, a reviewing user further has the option to provide review information beyond answer selections or text responses to the various questions, such as by uploading supporting documents. For example, a reviewing user who tried to reproduce experimental results discussed in a publication may be able to upload his data to support his contention of the reproducibility or irreproducibility of the published research being reviewed; following receipt of such supporting data by the system (operation 326), the supporting data may be associated with the reviewing user's own profile, e.g., as a published dataset (operation 328). Or, if a reviewer takes the published experimental for granted, but questions the adequacy of the interpretation or analysis, she may provide her own analysis of the data. Reviewers may also upload other relevant publications that they think could or should have been cited in the publication being reviewed. In various embodiments, any kind of files can be attached both to the individual review questions or categories, as well as to the review as a whole; these files may be added to the reviewer's profile.

In general, review data objects may be associated with the reviewing user's profile, e.g., such that, upon viewing the reviewer's profile, a list of reviews she submitted appears. In some embodiments, a reviewer can choose to identify other people that contributed to a particular review (such as co-workers that helped conduct experiments trying to reproduce the results of a publication) (see sub-operation 330); this is similar to the practice of giving credit to all contributors to a scientific publication. The system may create links between a review and the user profiles of all contributors to the review. Further, when the review information is subsequently displayed to a review consumer, the review contributors may, like the main reviewer, be listed along with the review.

In some embodiments, review information is received from multiple (independently) reviewing users (generally indicated at 332). In this case, the review information may be aggregated across the multiple user reviews (operation 334). For example, from the reviewers' selections among a small number of predetermined answer choices for a set of questions (such as yes, no, or partly), the number of times each answer choice was selected can be determined. Similarly, if, in another embodiment, reviewers were asked to rate certain aspects of the publication on a numerical scale (e.g., from 1-5), averages of the responses can be computed. The aggregate information may be stored as a review overview data object in the review repository.

Once at least one user has completed her review of a publication and the entered review information has been submitted and stored in the form of one or more review data objects, the stored information may be processed for visual presentation in a user interface. For example, the selected answers from among the predetermined answer choices may be presented in a compact form, with links to the supporting textual responses and/or other justifying information. In cases where review information has been received from multiple reviewers, a review overview may be generated from the aggregated information. In some embodiments, this overview is created regardless of the number of reviews received for a given publication. (In this case, the numbers of answers to each qualitative question simply add up to one, and the average response to a quantitative question is simply the one response received for the question.)

The review overview and/or the individual reviews may be presented in association with the publication. To that end, the publication user interface may be updated to provide digital viewing access to the review information (operation 336) in one of various alternative manners. In some embodiments, the review overview and/or individual reviews are displayed directly alongside the publication (sub-operation 338). In other embodiments, the publication user interface displays a review overview, and includes links to the individual reviews (sub-operation 340); upon execution of one of the review links, the selected review is then displayed in a separate review user interface (sub-operation 342). In still further embodiments, the publication user interface merely displays a link to the review overview and/or an individual review (sub-operation 344), and the review information itself is shown in a separate review user interface (sub-operation 346).

In various embodiments, the user interface presenting the review (whether it be the publication user interface or a separate review user interface) includes functionality for receiving feedback from viewers, or "consumers," of the review(s) (operation 348). For example, users may be able to select whether they found a review helpful or not (or rate the reviews helpfulness on a numerical scale). In addition, they may have the opportunity to write comments pertaining to the review, which may thereafter be displayed along with the review. The feedback provided may be used to adjust the presentation of the reviews (operation 350). In addition to supplementing an individual review directly by displaying the feedback, the system may, for instance, sort or rank reviews for a particular publication based on the ratings they received, e.g., such that the review that is deemed the most helpful appears first. In some embodiments, commenters, like reviewers, have the opportunity to upload files to support the statements they make; these files may be added (e.g., as dataset publications) to the commenter's profile. Furthermore, readers may have the ability to mark a comment as either "helpful" or "not helpful." This creates another feedback loop that allows researchers to curate reviews and ultimately separate the useful contributions from biased or otherwise flawed contributions.

In some embodiments, all reviews can be commented on by any user of the platform. Reviews may be publically visible to any Internet user, whereas interactions (such as commenting on or rating reviews) may be limited to users signed up to the social network. Reviewers and authors of the publication being reviewed may be specifically identified as such (e.g., on the user interface where the comment or feedback, or access thereto, is provided) to distinguish them from general commenters. In some embodiments, comments cannot be made anonymously, to ensure the quality and accountability of the contributor.

In one example embodiment, reviews and feedback thereon are used to calculate two kinds of "signals" for each publication being reviewed as well as for each individual review: one indicative of general interest in or the popularity of the subject of the publication or review, and one on the general opinion about the publication or review. For publications, general interest can be measured based, at least in part, on the number of reviews the publication has received, and the general opinion is characterized by the general slant of the reviews (e.g., favorable, neutral, or unfavorable). Similarly, for individual reviews, general interest can be measured based, at least in part, on the number of comments and/or the number of feedback votes (regardless whether favorable or unfavorable) the review has received, and the general opinion is reflected in the trend of the feedback, e.g., whether the majority finds the review helpful (or not helpful) or whether opinions are tied between the two. Scores for the general interest in and general opinion on a given publication or review may be propagated to the individual users whose work is being evaluated, i.e., the authors of a publication (providing an assessment as to the popularity of their work and the favorability/unfavorability of reviews) or the reviewers (providing an indication how popular each reviewer's reviews, aggregated across publications, are relative to other reviews, and whether they receive predominantly positive or negative feedback). Further decisions within the system may be based on the scores as propagated to the users. For example, the contents provided by users who receive largely positive reviews and feedback may be more frequently or more prominently displayed or suggested to interested users. Conversely, reviewing users whose reviews are largely considered unhelpful may be restricted in their ability to submit further reviews.

FIG. 5 shows an example user-interface screen displaying a review overview. Herein, publication information 500 for the reviewed publication, such as bibliographic information and an image of the publication (e.g., an image of the first page, or a selected figure from the publication), which may function as an executable link leading to the full-text version, are displayed at the top. Links to request a (further) review may also be provided. Underneath, a list 502 of reviewers may be depicted, with links to their individual reviews and, optionally, a very brief indication of the major conclusion of their review (e.g., whether the published research is reproducible or not). The reviewers may be identified by name, institution, and optionally a photo, and one of these components (e.g., the name) may serve as an executable link to the reviewing user's profile. Additionally, one or more scores indicative of the reviewer's reputation may be displayed.

Furthermore, an overview 504 of the aggregated review information may be provided. This overview allows review consumers to quickly gauge a given publication's general perception by the research community. It may show the spread of the individual answers to the structured questions (e.g., in the form of a chart that lists, along with each of the questions, the number of times each of the possible responses was selected), thereby giving a balanced overview of the publication's perceived merits or lack thereof in the different categories, before a reader has to delve into the more detailed explanations of individual reviewers in the free text sections. The review overview may include a link to the more detailed individual reviews. Alternatively or additionally, excerpts 506 of the individual reviews may be listed on the same page (e.g., at the bottom end). The list of reviews may be ranked, for instance, based on a ranking score computed by the review recommendation system. In some embodiments, the reviews may also be filtered based on criteria selected by the review consumer. For example, the consumer may be interested only in reviews that contradict the findings of the reviewed publication.

Figure 6A:
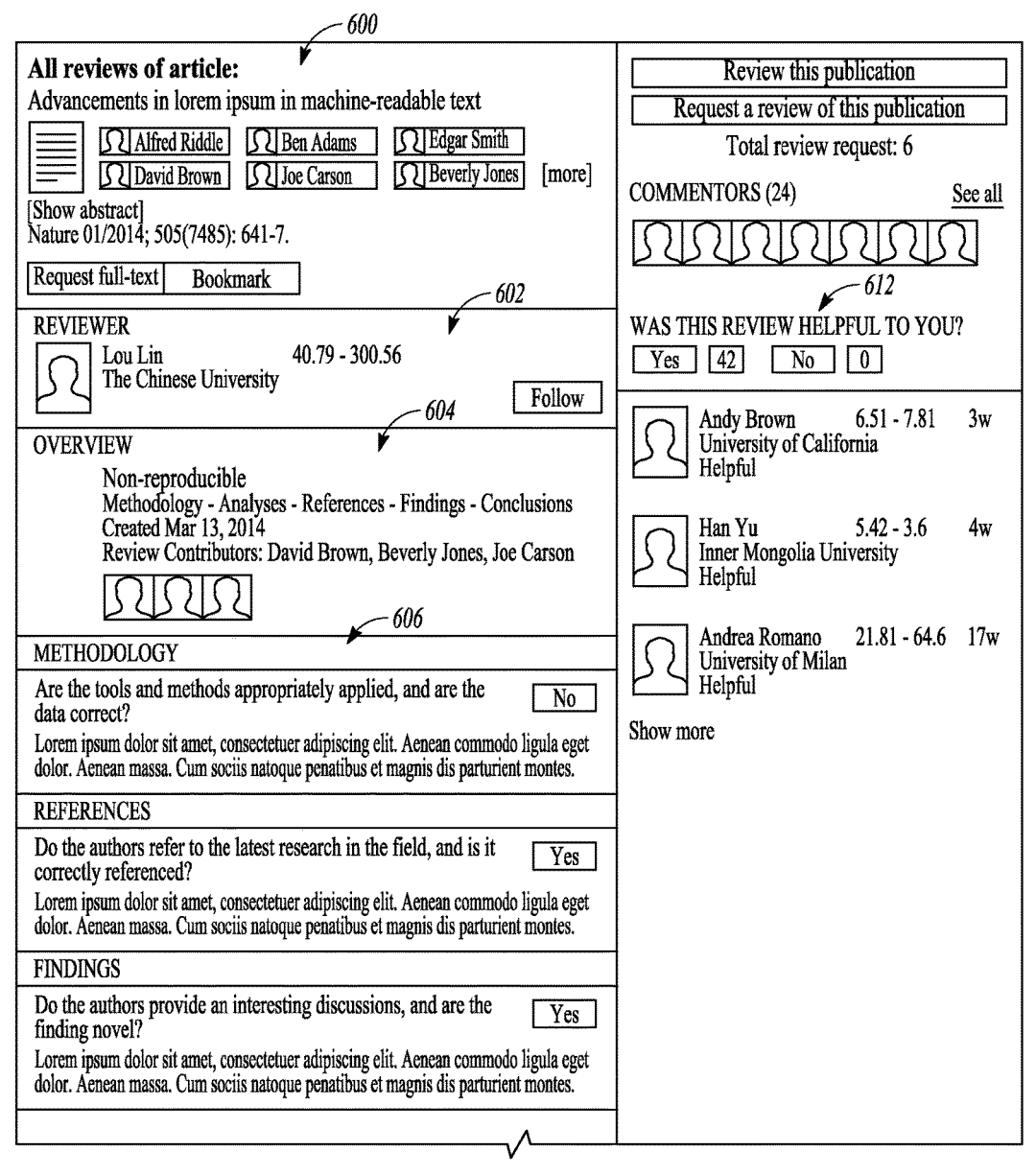

FIGS. 6A and 6B show an example user-interface screen showing a detailed individual review. Again, publication information 600 and/or a link to the publication being reviewed is displayed, followed by information 602 about the reviewer (such as, in addition to her name, scores reflecting the user's standing within the online social network and/or the impact of her research and publications), including a link to his user-profile page, and a brief summary 604 of the review (which may, for instance, list the review contributors, the date of the review, the overall conclusion, and the review categories addressed). Underneath, the detailed answers 606 to the various review questions are shown, and links to any supporting documents 608 (e.g., the reviewer's own datasets) are provided. The review may be followed by viewer comments 610 and the reviewer's responses thereto; in some cases, this section may take on the life of a discussion forum related to the publication. The comments may be linked to the commenters' user profiles, or information identifying the commenter may otherwise be displayed along or associated with the comment. Further, to provide readers with information that allows them, e.g., to select among large numbers of comments, the commenters' reputation may be indicated, e.g., in the form of scores (such as scores computed within and imported from outside the system), as shown in FIGS. 6A and 6B. In some embodiments, a separate column includes one or more user-interface elements 612 that solicit an evaluation of the review (e.g., by asking "Was this review helpful to you?"), summarizes already received feedback (e.g., by indicating how many review consumers found the review helpful), and/or lists the commenters themselves.

The social network and publication system described herein can generally be implemented on a computing system, e.g., in the form of one or more software programs executing on one or more interconnected computers. Users can access the system via a network (such as the Internet), using any of a number of client devices (such as, e.g., desktop computers, laptop computers, or mobile computing devices including mobile telephones), to view and/or contribute content (such as publications, reviews, and comments) via appropriate user interfaces. The system may present both web interfaces that allow interactions with browser client applications, and application programming interfaces (APIs) that facilitate interactions with mobile applications executing on mobile client devices (e.g., smartphones).

In various embodiments, programs and program modules implementing the functionality described above include user-interface modules that define the layout of various screens, facilitate the receipt of user input, and govern navigation from screen to screen (the "front-end" of the system), as well as logic or processing modules that process data provided to the system (e.g., to compute user scores, publication and review recommendations, etc.), manage the storage and organization of the data, and create links between various items of data (the "back-end" of the system).

In some embodiments, the data is centrally stored, e.g., on a database server accessible by the various program modules. In other embodiments, the data is stored in a distributed manner, for example, such that different types of data are located on different storage-media in proximity to the program modules that primarily use them. For example, in one embodiment, the system includes a user-account server that stores user-account data and user profiles and manages, e.g., the user sign-up process as well as the authentication of registered users upon sign-in; a publication server that stores full-text publications and associated metadata and provides user interfaces for uploading and viewing publications, as well as an automatic publication-retrieval module that scrapes open resources (such as the web) and facilitates bulk uploads from publication repositories; and a review server that stores and manages reviews and comments and includes program modules implementing the publication and review recommendation sub-systems (which may determine recommendations based at least in part on the reviews and feedback thereon). Of course, the system's computational functionality and data can be distributed across multiple servers in many different ways.

Figure 7A:
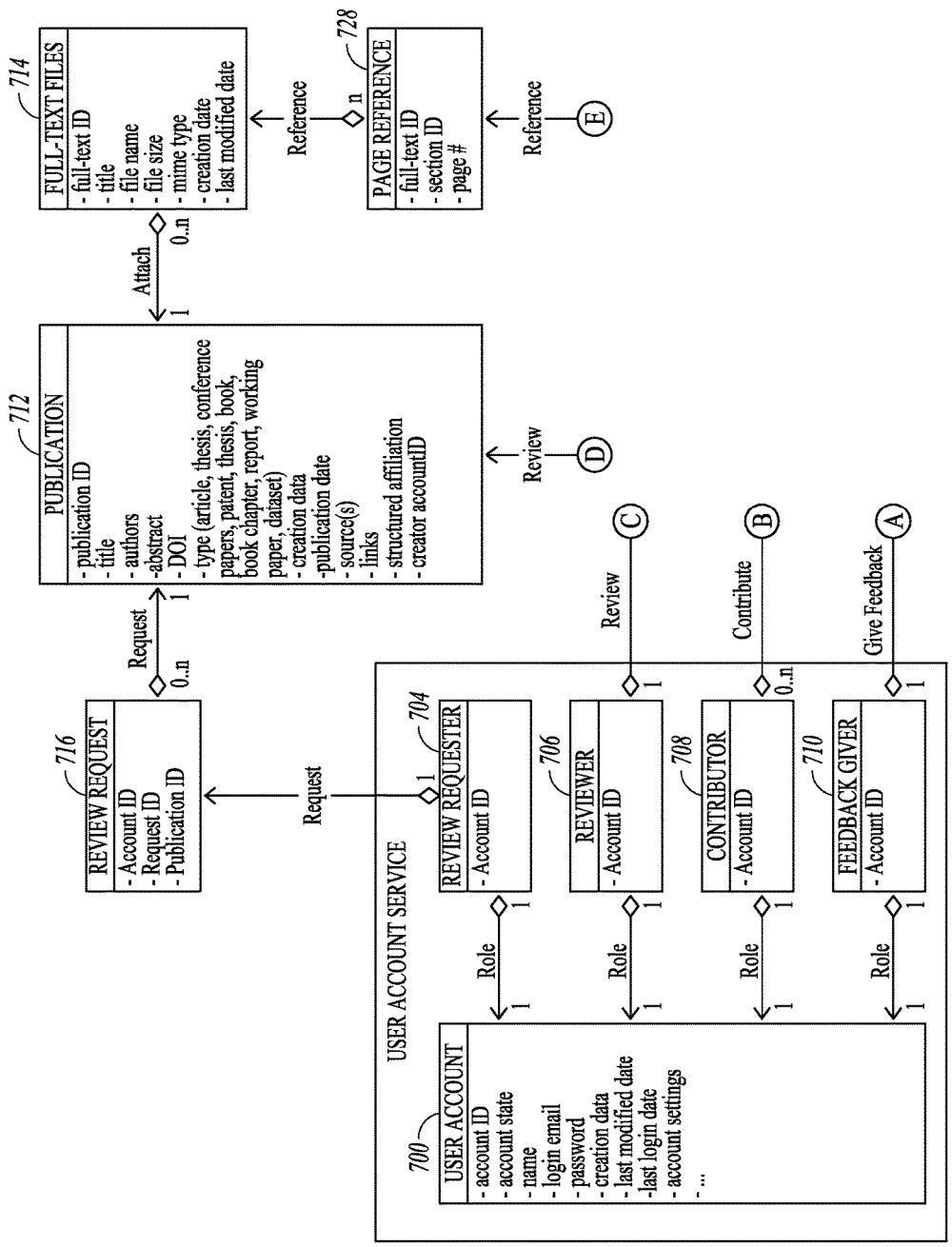
FIGS. 7A and 7B provide an entity-relationship diagram depicting various data objects storing information used within a social network and publication system with publication review functionality in accordance with various embodiments.
Figure 7B:
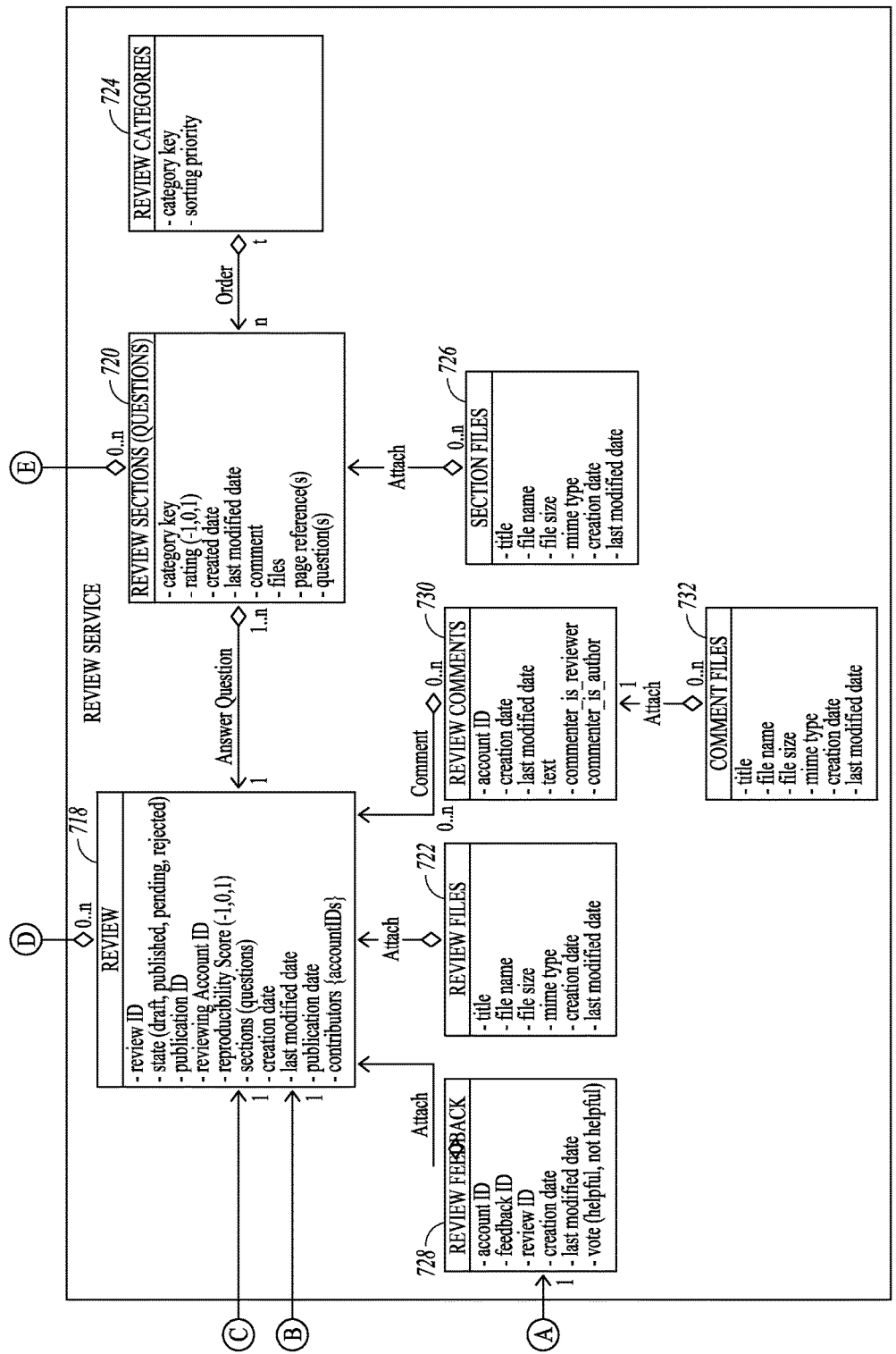

FIGS. 7A and 7B illustrate, in block-diagram form, how user data, publication data, and review data may be structured in accordance with an example embodiment. The data generally includes, for each user, associated user-account data 700. The user-account data 700 may include an account identifier (ID) (e.g., an integer number that uniquely identifies each account); optionally an indicator of a state of the account (e.g., active, inactive, suspended, etc.); login and authentication information such as a user name and/or login email address and user password; optionally information about the user (e.g., her full name, contact information, affiliations, etc.); account-history information such as the dates when the account was created or last modified, or when the user last logged into the account; account settings (specifying, e.g., the user's home page within the system or other user preferences); and/or other types of data. Within the system, a user may act in multiple roles vis a vis a publication, e.g., as author of a publication, review requester 704, reviewer 706, review contributor 708, or feedback provider 710 to a review. Regardless which role the user assumes in a particular interaction with the system, she will always be identified with the same (i.e., her unique) user account ID, which may be stored in association with any content she generates. For example, as illustrated, each review request may be stored as a data structure including the requesting user's account ID; and the metadata for each review may include the reviewing user's account ID.

Publications may be stored, in accordance with the depicted example embodiment, in the form of publication data structure 712 that represents the publication within the social network and publication system, optionally in conjunction with the actual full text of the publication contained in a separate publication file 714 (e.g., in pdf format). The publication data 712 may include a publication ID with which the publication is uniquely identified within the system; a Digital Object Identifier (DOI) (assigned, e.g., by the social network and publication system itself for work originally published on the system, or by a third-party original publisher for work first published externally to the system) that allows system users to locate the full-text document if stored externally to the system and/or that allows external Internet users to locate a full-text file 714 stored within the system; bibliographic data such as title and author information (including, e.g., the authors' institutional affiliation), an abstract of the publication, the source of the publication (e.g., a particular journal, if applicable), and the type of the publication (e.g., an article, thesis, conference paper, patent, book, book chapter, working paper, data set, etc.); the date of posting the publication in the system; the account ID of the user who created the publication in the system (which may or may not be an author of the publication); and links to information related to the publication, such as, e.g., reviews. The full-text files 714 may be stored within the social network and publication system itself (e.g., in a separate file repository on the same database server that also stores the publication data 712, or on a separate server), or externally to the system (e.g., on a publically accessible web site) such that it can be accessed from within the system only via a link. Full-text files 714 may be characterized by a full-text ID, the title, file name, file size, mime type, the dates of creation and last modification, which may be stored as part of the file metadata (i.e., within the file itself).

When a user requests a review of the application, a review-request data structure 716 is created; the review-request data 716 includes a request ID uniquely identifying the request (e.g., such that different users requesting reviews for the same publication result in different instances of review-request data 716, allowing the system, e.g., to track how many review requests have been received for a particular publication) and specifies at least the account ID of the requesting user and the publication ID for which the review is being requested. This illustrates how various data structures used within the system (such as, e.g., review request 716, publication data 712, and user-account data 700) are associated with (or "linked to") each other via references or cross-reference of their respective IDs.

For each review created, a review data structure 718 is stored in the system. The review data structure 718 includes a unique review ID for the review; an indication of the state of a review (e.g., whether it is in draft, published on the system, pending approval, or rejected); the ID of the publication 712 to which the review pertains; the user-account IDs of the reviewer himself and any contributors to the review; dates associated with the review, such as the creation date, last-modification date, and publication date of the review; the overall conclusion of the review (e.g., whether it is reproducible, as may be indicated numerically with a score of 1, −1, or 0 (for not applicable)); and links to data 720 for the individual review sections and/or files 722 associated with the review. The review files 722 may be characterized by a title, file name, file size, mime type, and creation and last-modification dates.

As described above, a review may include answers to a number of specific questions. These questions may be grouped into multiple categories (each of which may include multiple questions, but may, in an extreme case, have only a single question) that correspond to different review sections focusing on different aspects of a publication (such as reproducibility, appropriateness of methodology and quality of analysis, importance, etc.). The categories themselves may be defined in a review-category data structure 724 that is identified by a category key and establishes the sorting priority of the questions within the category. The questions themselves as well as the answers provided by the reviewer may be stored in separate review-section data structures 720, one for each category, that are identified by their respective section IDs (which are unique across both reviews and categories) and may specify creation and last-modification dates. The review-section data 720 identifies the associated category by its key and stores the text of the various question(s) within the category, the reviewer's numerical answers to these questions (i.e., his ratings), as well as any free-text comments she provides on the section. Further, the review-section data 720 may include references to supporting files 726 (herein "section files") attached by the reviewer (which, like the review files 722, may be characterized by a title, file name, file size, mime type, and creation and last-modification dates), and page references to portions of the publication upon which the ratings are based. In some embodiments, page references that link publications and review sections give rise to separate page-reference data structures 728, which specify the ID of and page(s) within the full-text file 714 of the publication and the section ID of the review section 720 to which they pertain.

Further, as described above, the system may provide readers of the reviews with the ability to rate a review (e.g., in terms of his helpfulness) and/or provide verbal comments on the review. This information is stored in review-feedback data structures 728 and review-comment data structures 730, respectively. The feedback data structure 728 includes a unique feedback ID by which it can be identified, the user-account ID of the feedback provider, the review ID of the review to which the feedback pertains, optionally creation and last-modification dates, and the feedback provider's overall rating of the review (e.g., as helpful or not helpful). The review-comment data structure 730 includes, similarly, a unique review-comment ID, the user-account ID of the reviewing user and the review ID, optionally creation and last-modification dates, and the text of the user-provided comment. In addition, the review-comment data 730 may include flags that indicate if the comment was made by the author of publication subject to the review or by the reviewer. A review comment may also link to or reference a separate comment file 732 upload by the commenting user in connection with the comment.

Accordingly, the overall user, publication, review, and feedback data may be stored as a combination of structured data (e.g., data structures 700, 712, 718, 720, 728, etc.), which may be organized, e.g., in various database tables, and (unstructured) files (such as, e.g., pdf documents) (e.g., full-text publication files 714 and review/feedback-supporting files 722, 726,732).

Figure 8:
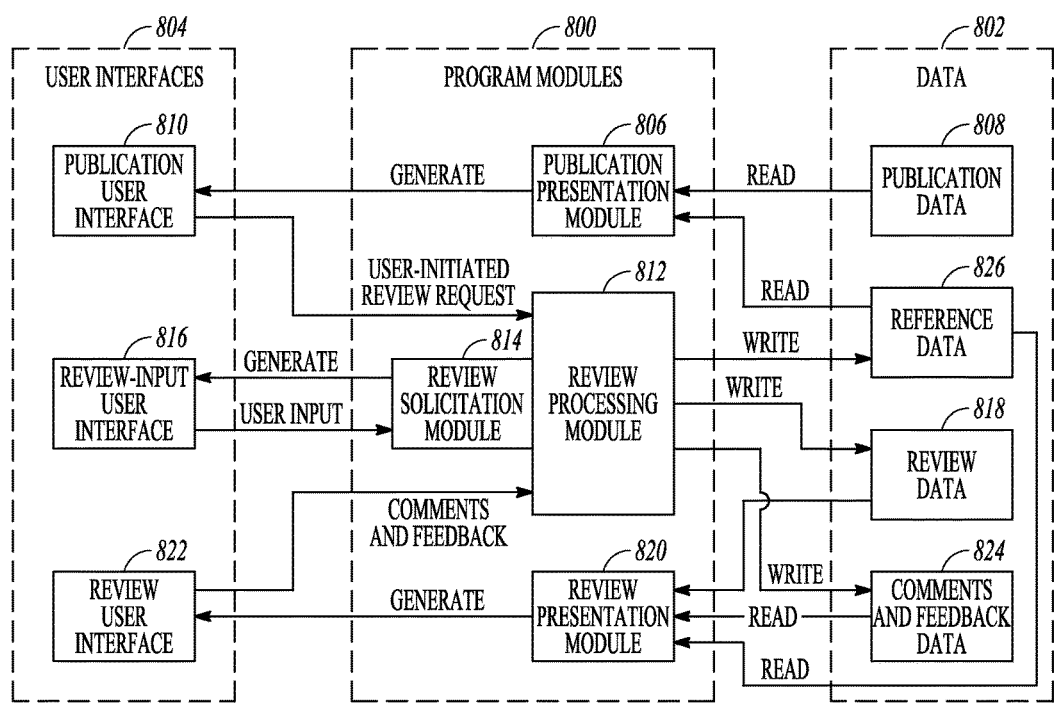
FIG. 8 is a block diagram illustrating the relations between various program modules, data objects, and user interfaces in accordance with various embodiments.

FIG. 8 illustrates, in block-diagram form, the relations between various program modules 800, data 802, and user interfaces 804 in accordance with one example embodiment of a social network and publication system as disclosed herein. As depicted, the system may include a publication presentation module 806 that generates, based on stored publication data 808 (such as publication metadata structures 712 and/or full-text files 714), a publication user interface 810, e.g., as shown in FIG. 2A. (By "generating a user interface" is meant, in this context, the assembly of all data and layout information used (e.g., by a client device connected to the system upon transmission thereto) to create a screen display in accordance herewith (e.g., as depicted in FIG. 2A).) A user-initiated review request submitted via a suitable component of the publication user interface 810 triggers the solicitation, receipt, and processing of review information by a review processing module 812.

The review processing module 812, which is generally a back-end component, may include or, alternatively, call a review solicitation module 814 that creates (based, e.g., on the review categories data structure 724 and/or portions of the publication data 808) the review-input user interface(s) 816 through which a reviewing user can provide review information, such as the user interfaces depicted in FIGS. 4A-4C. The user input provided through interface(s) 816 is processed by the review processing module 812 to create and/or update data objects storing the review data 818 (such as, e.g., review and review-section data structures 718, 720 and any associated review or section files 722, 726). A review presentation module 820, in turn, generates a review user interface 822 (such as the user interfaces depicted in FIGS. 5 and 6A-6B) based on the review data 818. The review user interface 822 may include functionality allowing a review consumer to provide feedback or comments on the review. Such user input is likewise processed by the review processing module 812, resulting in the creation of comments and feedback data objects 824 (such as, e.g., review feedback data structures 728, review comment data structures 730, and/or comment files 732). The review presentation module 820 may read in the comments and feedback data 824 to display them along with the review data or otherwise adjust the review user interface 822 to reflect the feedback and comments. The review processing module 812 may also establish links or connections between review data 818 and the publication to which it pertains as well as between comments and feedback data 824 and the review to which it pertains, e.g., by creating suitable entries in a data structure storing reference data 826. The reference data 826 may be used by both the publication presentation module 806 and the review presentation module 820 to update the publication and review user interfaces 810, 822 with the associated reviews and comments/feedback or links thereto.

Of course, as will be readily understood by those of ordinary skill in the art, the depicted modules 808, 812, 820 represent only one among many possible ways for organizing the system's review-processing and publication/review-presentation functionality. In alternative embodiments, the creation and management of user interfaces and data can be distributed over fewer, more, and/or different modules than shown in FIG. 8.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or using any suitable combination thereof. For instance, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions, and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

Figure 9:
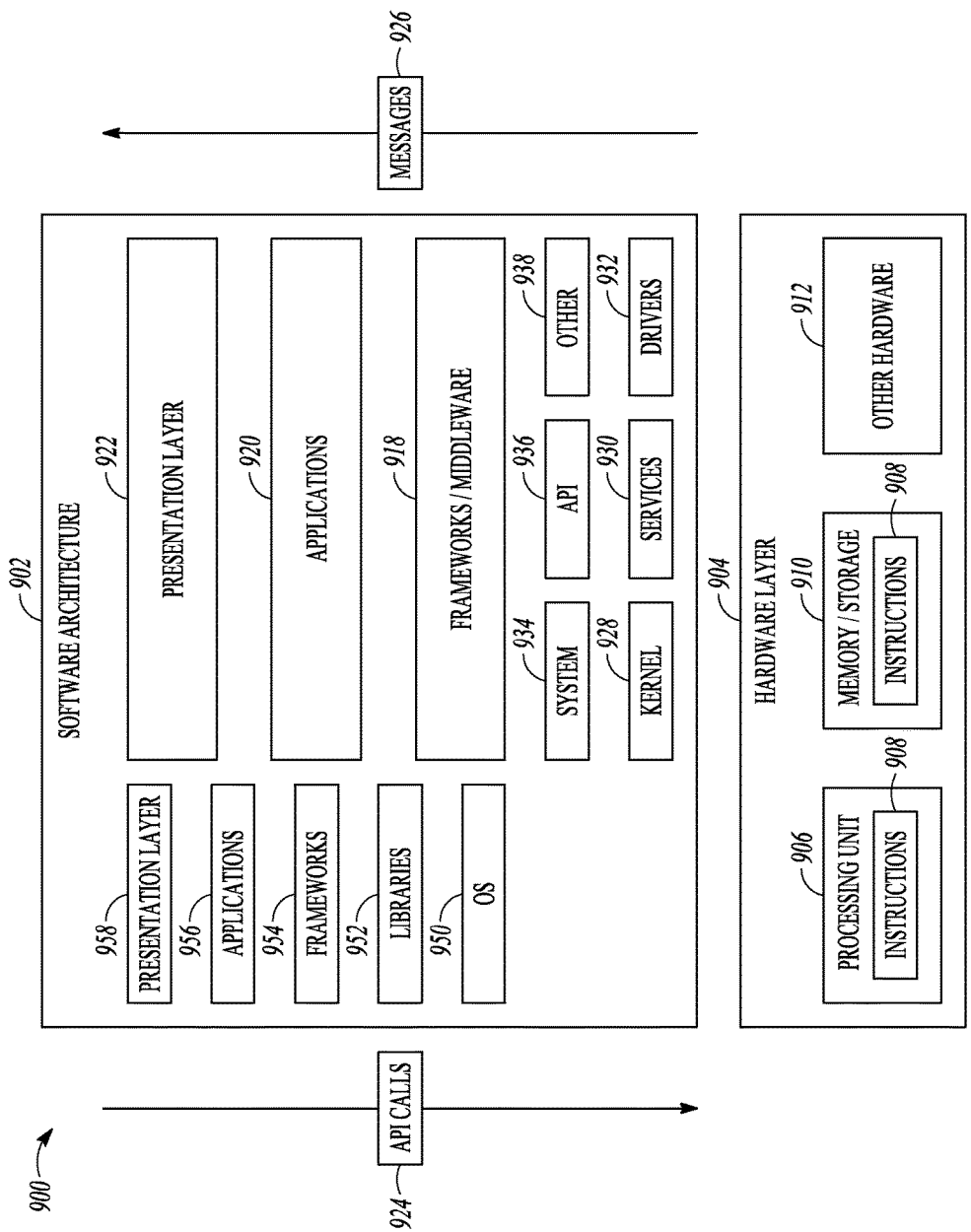
FIG. 9 is a block diagram illustrating an example of a software architecture that may be installed on a machine, according to various embodiments.
Figure 10:
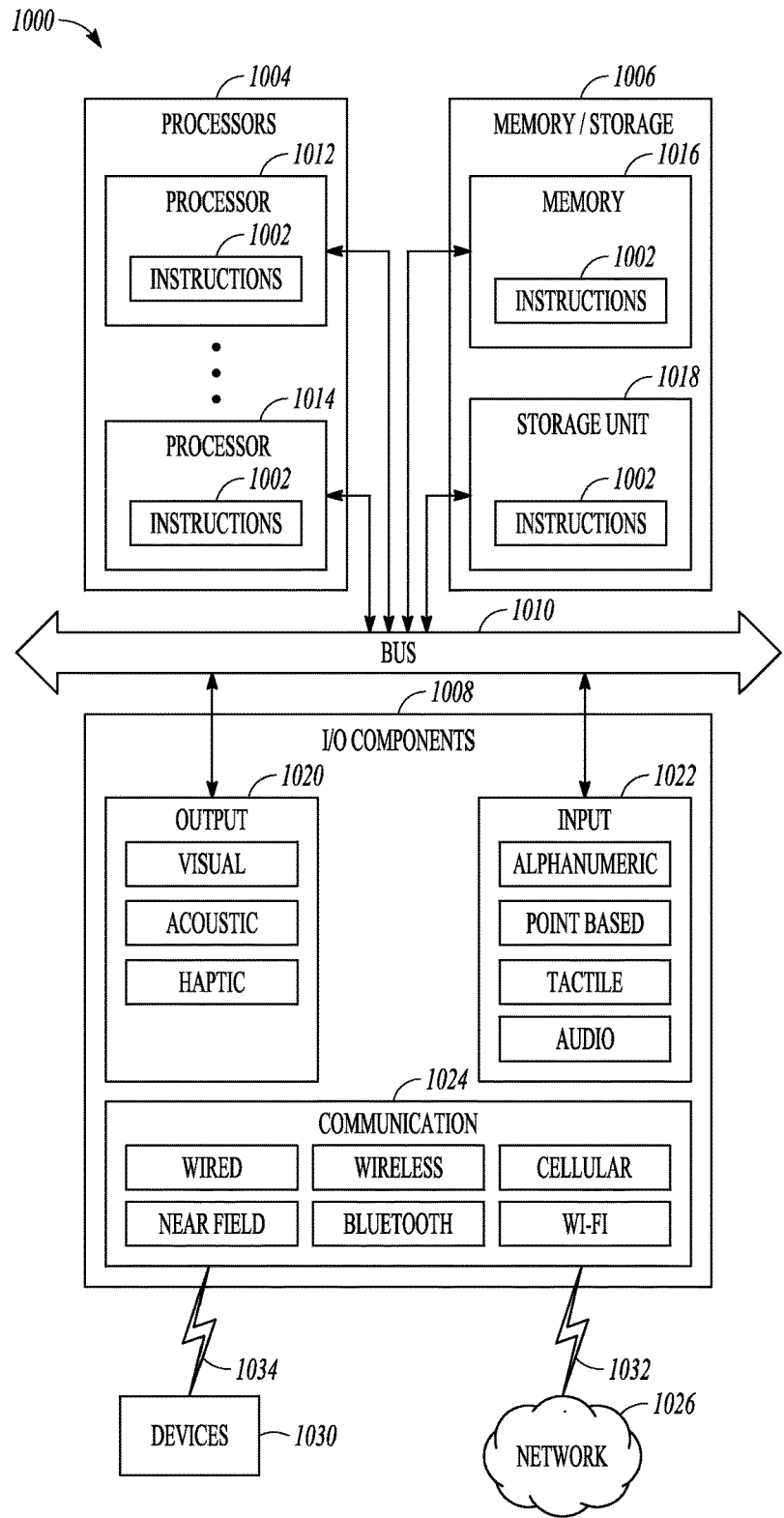
FIG. 10 is a block diagram of a machine in the form of a computer system within which a set of instructions for causing the machine to perform any one or more of the methodologies discussed herein may be executed, in accordance with various embodiments.

The modules, methods, applications and so forth described in conjunction with FIGS. 1-8 are implemented in some embodiments in the context of a machine and an associated software architecture. FIGS. 9 and 10 depict representative software and machine (e.g., hardware) architectures that are suitable for use with the disclosed embodiments. Software architectures are used in conjunction with hardware architectures to create devices and machines tailored to particular purposes.

FIG. 9 is a block diagram 900 illustrating a representative software architecture 902, which may be used in conjunction with various hardware architectures herein described. FIG. 9 is merely a non-limiting example of a software architecture and it will be appreciated that many other architectures may be implemented to facilitate the functionality described herein. The software architecture 902 may be executing on hardware such as machine 1000 of FIG. 10 that includes, among other things, processors 1004, memory 1006, and I/O components 1008. A representative hardware layer 904 is illustrated and can represent, for example, the machine 900 of FIG. 10. The representative hardware layer 904 comprises one or more processing units 906 having associated executable instructions 908. Executable instructions 908 represent the executable instructions of the software architecture 902, including implementation of the methods, modules and so forth of FIGS. 1-7B. Hardware layer 904 also includes memory and/or storage modules 910, which also have executable instructions 908. Hardware layer 904 may also comprise other hardware as indicated by 912.

In the example architecture of FIG. 9, the software 902 may be conceptualized as a stack of layers where each layer provides particular functionality. For example, the software 902 may include layers such as an operating system 914, libraries 916, frameworks/middleware 918, applications 920, and presentation layer 922. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature and not all software architectures have all layers. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 may utilize built-in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 922. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the machine of FIG. 10, for example). A virtual machine is hosted by a host operating system and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

FIG. 10 is a block diagram illustrating components of a machine 900, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system within which instructions 1002 (e.g., software, a program, an application, an applet, an app, or other executable code) for causing the machine 1000 to perform any one or more of the methodologies discussed herein may be executed. For example, the instructions may cause the machine to execute the flow diagrams of FIGS. 3A-3B, and/or may implement the publication presentation, review processing, and review presentation modules 806, 812, 820 of FIG. 8. The instructions 1002 transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), a mobile device, a web appliance, or any machine capable of executing the instructions 1002, sequentially or otherwise, that specify actions to be taken by machine 1000. Further, while only a single machine 1000 is illustrated, the term "machine" shall also be taken to include a collection of machines 1000 that individually or jointly execute the instructions 1002 to perform any one or more of the methodologies discussed herein.

The machine 1000 may include processors 1004, memory 1006, and I/O components 1008, which may be configured to communicate with each other such as via a bus 1010. In an example embodiment, the processors 1004 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1002. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1006 may include a memory 1016, such as a main memory, or other memory storage, and a storage unit 1018, both accessible to the processors 1004 such as via the bus 1010. The storage unit 1018 and memory 1016 store the instructions 1002 embodying any one or more of the methodologies or functions described herein. The instructions 1002 may also reside, completely or partially, within the memory 1016, within the storage unit 1018, within at least one of the processors 1004 (e.g., within the processor's cache memory), or any suitable combination thereof, during execution thereof by the machine 1000. Accordingly, the memory 1016, the storage unit 1018, and the memory of processors 1004 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions (e.g., instructions 1002) for execution by a machine (e.g., machine 1000), such that the instructions, when executed by one or more processors of the machine 1000 (e.g., processors 1004), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1008 may include a wide variety of components to receive input, provide output, produce output, transmit information, exchange information, and so on. The specific I/O components 1008 that are included in a particular machine will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various example embodiments, the I/O components 1008 may include output components 1020 and input components 1022. The output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1008 may include communication components 1024 operable to couple the machine 1000 to a network 1026 or devices 1030 via coupling 1032 and coupling 1034, respectively. For example, the communication components 1024 may include a network interface component or other suitable device to interface with the network 1026. In further examples, communication components 1024 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1030 may be another machine or any of a wide variety of peripheral devices (e.g., a peripheral device coupled via a Universal Serial Bus (USB)).

A variety of information may be derived via the communication components 1024, such as, location via Internet Protocol (IP) geo-location, location via Wi-Fi® signal triangulation, location via detecting a NFC beacon signal that may indicate a particular location, and so forth.

In various example embodiments, one or more portions of the network 1026 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1026 or a portion of the network 1026 may include a wireless or cellular network and the coupling 1032 may be a Code Division Multiple Access (CDMA) connection, a Global System for Mobile communications (GSM) connection, or other type of cellular or wireless coupling. In this example, the coupling 1032 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1002 may be transmitted or received over the network 1026 using a transmission medium via a network interface device (e.g., a network interface component included in the communication components 1024) and utilizing any one of a number of well-known transfer protocols (e.g., hypertext transfer protocol (HTTP)). Similarly, the instructions 1002 may be transmitted or received using a transmission medium via the coupling 1034 (e.g., a peer-to-peer coupling) to devices 1030. The term "transmission medium" shall be taken to include any intangible medium that is capable of storing, encoding, or carrying instructions 1002 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. Within an online social network and publication system having a plurality of registered users, a method comprising, by one or more processors of the system executing instructions stored in one or more computer-readable media:

for each of a plurality of research publications, generating a respective publication user interface, accessible by each of the registered users, that displays or links to the research publication, the publication user interface comprising one or more user-interface elements enabling each of the registered users to initiate a review by issuing a digital request to review the research publication and further enabling each of the registered users to initiate a review by issuing a digital request for solicitation of a review of the research publication from one or more other users that are to be automatically determined by the system without input from the user requesting solicitation of the review;

in response to receipt of a digital request for solicitation of a review from one or more other users, automatically identifying, among the registered users, one or more that are researchers in a field of the respective research publication based at least in part on a level of interest-relatedness with the research publication, and inviting the one or more identified registered users to become reviewers; and upon acceptance, by one of the identified registered users, of an invitation to become a reviewer, or in response to receipt, from any of the registered users, of a digital request to review the research publication, soliciting and receiving digital review information from the respective identified or requesting registered user via a review user interface, adjusting impact of the digital review information in consideration of a level of biases of the reviewer based on the level of social relatedness of the reviewer with an author of the research publication, and updating the publication user interface with at least a portion of the digital review information or a link to at least a portion of the digital review information; and making publication and review recommendations to the registered users based at least in part on an analysis of a level of social relatedness between the registered users and a level of interest relatedness between the registered users and the research publications and digital review information.

2. The method of claim 1, wherein the one or more users that are researchers in the field of the respective research publication are identified based on at least one of digital user profiles associated with the one or more users or a relatedness of the one or more user's interests to a topic of the publication, the relatedness determined by the social network and publication system.

3. The method of claim 2, wherein the relatedness of the topic of the publication to interests of a user to be invited to become reviewing user is determined based on a cluster of topics computed from the user's own publications.

4. The method of claim 1, wherein the digital review information comprises answers to one or more questions relating to reproducibility or quality of the research described in the research publication and one or more free-text comments supporting the one or more answers.

5. The method of claim 4, wherein the digital review information further comprises supporting data associated with one or more of the answers.

6. The method of claim 5, further comprising associating the supporting data with a digital user profile associated with the reviewing user.

7. The method of claim 4, wherein soliciting and receiving digital review information comprises allowing the reviewing user to select a portion of the publication for insertion into the free-text comment, and automatically supplementing the free-text comment with a reference to the selected portion.

8. The method of claim 7, further comprising automatically annotating the referenced portion of the publication, based on the reference thereto in the free-text comment, with the associated answer or a link thereto.

9. The method of claim 7, wherein allowing the reviewing user to select a portion of the publication for insertion into the free-text comment comprises displaying a user-interface component that allows the user to manually select the portion of the publication.

10. The method of claim 4, wherein the questions further comprise one or more questions related to at least one of appropriateness of a methodology or analysis applied, inclusion of relevant citations to related work, novelty and/or importance of research findings, or justification of a conclusion in view of research results.

11. The method of claim 1, further comprising receiving digital review information from multiple reviewing users, automatically aggregating the received digital review information, and updating the publication user interface with the aggregated digital review information or a link to the aggregated digital user information.

12. The method of claim 11, wherein soliciting the review information comprises presenting the reviewing user with a predetermined set of one or more questions relating to multiple aspects of research-publication quality and an associated predetermined set of answer choices for each of the questions, and wherein automatically aggregating the review information comprises counting, for each of the predetermined questions and each of a number of available answer choices for the question, a number of times that answer choice has been selected by the multiple reviewing users.

13. The method of claim 12, wherein the publication user interface is updated with a review overview, or a link to a review overview, generated based on the aggregated digital review information, the review overview comprising, for each of the questions, the number of times each of the answer choices has been selected by the multiple reviewing users, and further comprising one or more links to one or more user interfaces including the review information received from the multiple reviewing users individually.

14. The method of claim 1, further comprising receiving, via a user interface element provided on a user interface including at least a portion of the review information, user feedback related to the review information.

15. The method of claim 14, wherein the feedback comprises an indication of a selected level of helpfulness of the review information.

16. The method of claim 14, further comprising, following receipt of the feedback, providing access to the feedback on the user interface including at least a portion of the review information.

17. The method of claim 16, further comprising indicating, on the user interface providing access to the feedback, if the feedback originates from an author of the publication or from the reviewing user.

18. The method of claim 16, further comprising displaying, in association with providing access to the feedback, an identity of a feedback-providing user and information indicative of the feedback-providing user's reputation.

19. The method of claim 14, further comprising processing the feedback and, based thereon, adjusting at least one of a score associated with the reviewing user or a rank of a set of review information received from one reviewing user among a plurality of sets of review information received for the publication from multiple reviewing users.

20. The method of claim 1, wherein the review information comprises a list of one or more people other than the reviewer that have contributed to the review.

21. The method of claim 1, further comprising displaying an identity of the reviewing user and information indicative of the reviewing user's reputation in association with the review information.

22. The method of claim 1, further comprising enabling each of the registered users to post research publications that the respective user authored to the system or to claim authorship of research publications already available on the system.

23. A social network and publication system comprising:
one or more processors; and
one or more machine-readable media configured to store data for each of a plurality of research publications and for each of a plurality of reviews, each review being associated with one of the plurality of research publications, and instructions which, when executed by the one or more processors, cause the one or more processors to perform operations comprising:
for each of the plurality of research publications, generating a respective publication user interface, accessible by each of a plurality of registered users of the social network and publication system, that displays or links to the research publication, the publication user interface comprising one or more user-interface elements enabling each of the registered users to initiate a review by issuing a digital request to review the research publication and further enabling each of the registered users to initiate a review by issuing a digital request for solicitation of a review of the research publication from one or more other users that are to be automatically determined by the system without input from the user requesting solicitation of the review;
in response to receipt of a digital request for solicitation of a review from one or more other users, automatically identifying, among the registered users, one or more users that are researchers in a field of the respective research publication based at least in part on a level of interest-relatedness with the research publication, and inviting the one or more identified registered users to become reviewers; and
upon acceptance, by one of the identified registered users, of an invitation to become a reviewer, or in response to receipt, from any of the registered users, of a digital request to review the research publication, soliciting and receiving digital review information from the respective identified or requesting registered user via a review user interface, adjusting impact of the digital review information in consideration of a level of biases of the reviewer based on the level of social relatedness of the reviewer with an author of the research publication, and updating the respective publication user interface with at least a portion of the digital review information or a link to at least a portion of the digital review information; and
making publication and review recommendations to the registered users based at least in part on an analysis of a level of social relatedness between the registered users and a level of interest relatedness between the registered users and the research publications and digital review information.

* * * * *